(12) United States Patent
Patel

(10) Patent No.: US 7,797,004 B2
(45) Date of Patent: Sep. 14, 2010

(54) SYSTEM, METHOD, AND DEVICE FOR PROVIDING CONTENT ON A WIRELESS COMMUNICATION DEVICE

(75) Inventor: Mehul B. Patel, Bangalore (IN)

(73) Assignee: Kyocera Corporation, Kyoto (JP)

( * ) Notice: Subject to any disclaimer, the term of this patent is extended or adjusted under 35 U.S.C. 154(b) by 936 days.

(21) Appl. No.: 11/464,465

(22) Filed: Aug. 14, 2006

(65) Prior Publication Data
US 2008/0036851 A1 Feb. 14, 2008

(51) Int. Cl.
*H04B 15/00* (2006.01)
(52) U.S. Cl. ............... 455/502; 455/419; 455/420; 455/426.2; 455/41.2; 455/507; 455/418; 705/44; 725/95; 725/101; 725/87; 725/98; 725/145
(58) Field of Classification Search ................. 725/147, 725/139, 149, 153, 95, 80, 81; 455/502
See application file for complete search history.

(56) References Cited

U.S. PATENT DOCUMENTS

| | | | |
|---|---|---|---|
| 7,474,889 B2* | 1/2009 | Bhakta et al. | 455/412.2 |
| 2004/0038692 A1* | 2/2004 | Muzaffar | 455/502 |
| 2004/0253945 A1 | 12/2004 | Janik | |
| 2005/0042999 A1 | 2/2005 | Rappaport | |
| 2005/0128048 A1 | 6/2005 | Krzyzanowski et al. | |
| 2005/0140790 A1 | 6/2005 | Min et al. | |
| 2005/0144020 A1* | 6/2005 | Muzaffar et al. | 705/1 |
| 2005/0210101 A1 | 9/2005 | Janik | |
| 2006/0031904 A1 | 2/2006 | Groff et al. | |

FOREIGN PATENT DOCUMENTS

| | | |
|---|---|---|
| EP | 1 331 761 | 7/2003 |
| EP | 1331761 A2 * | 7/2003 |
| EP | 1 439 666 | 7/2004 |
| GB | 2 408 159 | 5/2005 |
| JP | 2003-244680 | 8/2003 |
| WO | WO 02/47388 | 6/2002 |
| WO | WO 03/007580 | 1/2003 |

OTHER PUBLICATIONS

Internet Document "TiVo.com—What is TiVo" at www.tivo.com/1.0.asp (accessed Dec. 13, 2006).
Internet Document "TiVo.com—TiVoToGo" at www.tivo.com/4.9.4.1.asp (accessed Dec. 13, 2006).
Internet Document "TiVo.com—TiVo Mobility—Mobile Devices" at www.tivo.com/1.2.15.asp (accessed Dec. 13, 2006).
Internet Document "Creating a Wireless Peer-to-Peer Network" at www.customersupport.tivo.com/LaunchContent.aspx?CID=a77a29ec-fdbf-4977-a65e-726547959320 (accessed Dec. 13, 2006).

* cited by examiner

*Primary Examiner*—Charles N Appiah
*Assistant Examiner*—Randy Peaches

(57) ABSTRACT

A method for providing television content to a wireless communication device via a home network includes receiving channel selection information for a selected channel from the wireless communication device over a wireless communication link; tuning one or more tuners of a wireless access device to the selected channel; obtaining television content from a content source in communication with the wireless access device for the selected channel via a communication link; converting the television content for the channel to an appropriate format for the wireless communication device; and sending the television content for the channel in the appropriate format to the wireless communication device over the wireless communication link.

14 Claims, 4 Drawing Sheets

US 7,797,004 B2

SYSTEM, METHOD, AND DEVICE FOR PROVIDING CONTENT ON A WIRELESS COMMUNICATION DEVICE

TECHNICAL FIELD

The present invention generally relates to systems and methods for sending and receiving mobile content to and from a wireless communication device, and more particularly relates to transferring content between a wireless communication device, a television, and a content source.

BACKGROUND

Presently, to receive television content on a mobile phone, one needs a special type of mobile phone and a high capacity wireless link and service. A streaming application is required in the mobile phone to receive the television content. Standards such as DVB-H define the format for streaming content and the protocol to control the flow of the content. Not only is this high capacity wireless television service expensive, it is also slow.

SUMMARY

A method and device for providing television content to a wireless communication device via a home network is disclosed. The home network includes a wireless access device with one or more tuners in communication with a television content source through a first communication link, in communication with a television through a second communication link, and in communication with a wireless communication device through a third, wireless communication link. The method includes receiving channel selection information for a selected channel from the wireless communication device over the third, wireless communication link; tuning the one or more tuners to the selected channel; obtaining television content from the content source for the selected channel via the first communication link; converting the television content for the channel to an appropriate format for the wireless communication device; and sending the television content for the channel in the appropriate format to the wireless communication device over the third, wireless communication link.

Other features and advantages of the present invention will become more readily apparent to those of ordinary skill in the art after reviewing the following detailed description and accompanying drawings.

DETAILED DESCRIPTION

Certain embodiments as disclosed herein provide for systems, devices, and methods for providing content on a wireless communication device via a wireless communication link through a home network. For example, one method as disclosed herein allows a user with a wireless communication device to remotely select television channels via WIFI through a home network, and watch the television content for the selected channel with the wireless communication device.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
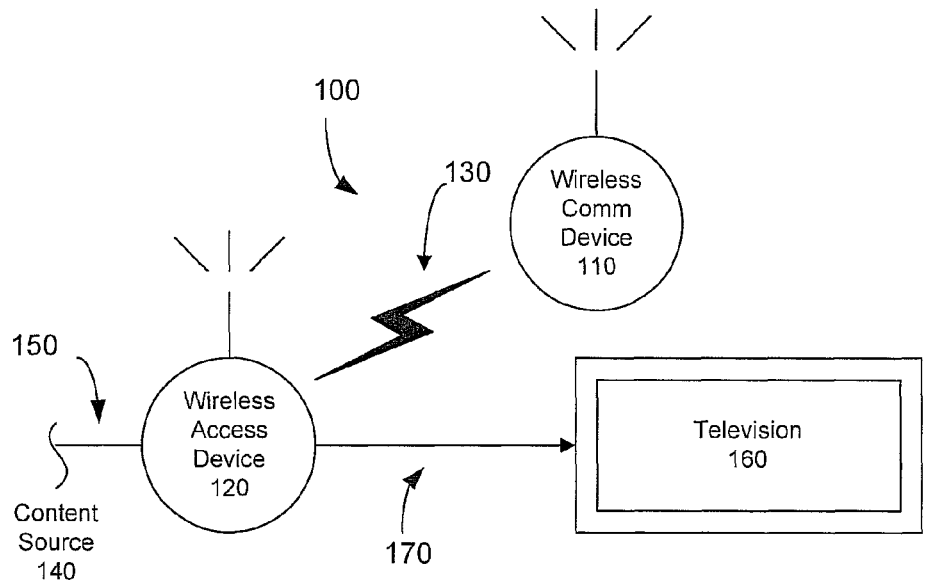
FIG. 1 is a block diagram illustrating an example system for providing content on a wireless communication device via WIFI through a home network.

FIG. 1 is a block diagram illustrating an example system 100 for providing content on a wireless communication device via a wireless communication link 130 through a home network according to an embodiment of the present invention. In the illustrated embodiment, the system 100 comprises one or more wireless communication devices (e.g., handset(s)) 110 and a wireless access point or wireless access device ("wireless access device") 120 in communication with each other through a wireless communication link 130 (e.g., WLAN, WIFI, Bluetooth, infrared). The wireless access device 120 receives content from a content source 140 (e.g., cable television provider, satellite television provider, internet service provider). The wireless access device 120 is in communication with the content source 140 via communication link 150. The wireless access device 120 delivers content to a television/monitor (hereinafter "television") 160 via communication link 170.

One or more of the communication links 150, 170 may be wired links (e.g., coaxial cable, ethernet connection, fiber optic connection, and/or a serial or universal serial bus ("USB") connection), wireless links (e.g., WLAN, WIFI, Bluetooth, infrared), direct links, and/or indirect links.

Figure 2:
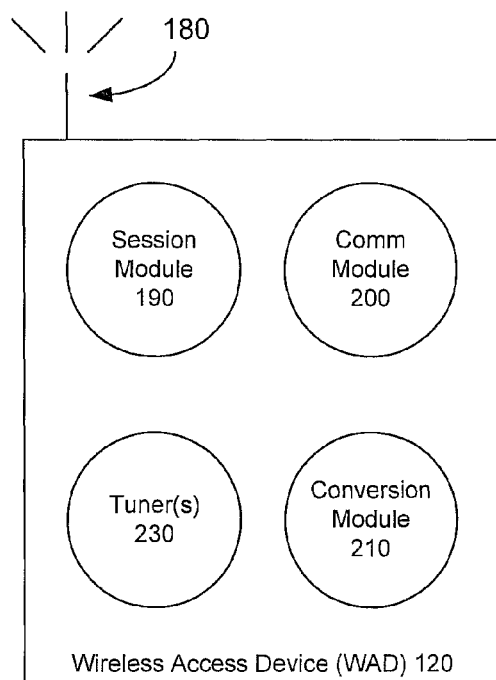
FIG. 2 is a block diagram illustrating an example wireless access device that is part of a system for providing content on a wireless communication device via WIFI through a home network.

With reference to FIG. 2, the wireless access device 120 includes one or more antennas 180 and appropriate hardware/software for wireless communication through the wireless communication link 130 with the one or more wireless communication devices 110. In the embodiment shown, the wireless access device 120 wirelessly communicates with the wireless communication device(s) 110 through one or more WIFI connections. In alternative embodiments, one or more alternative or additional communication links such as, but not limited to, wired links, wireless links (e.g., WIFI, Bluetooth, infrared), direct links, and indirect links, may be used. The wireless access device 120 includes a session module 190 for controlling send and receive sessions (e.g., session 1, session 2, session 3, session 4) between the wireless access device 120 and the wireless communication device(s) 110 (e.g., wireless communication device 1, wireless communication device 2, wireless communication device 3, wireless communication device 4). A communication module 200 controls communication between the wireless access device 120, the content source 140, the television 160, and the wireless communication device(s) 110. A conversion module 210 converts data representative of the content from the content source 140 into the appropriate format for the wireless communication device(s) 110 and/or television 160, and vice versa. Memory 220 may be an internal memory device or external memory device, and may include both persistent and volatile memories. The function of the memory 220 is to maintain data for long term storage and also to provide efficient and fast access to instructions for applications being executed by the wireless access device 120. The wireless access device 120 includes one or more tuners 230 that may be controlled by the wireless communication device(s) 110, the television 160, and/or other devices (e.g., remote control) for tuning the wireless access device 120 to different communication channels for obtaining different content provided by the content source 140 and providing the content to the wireless communication device(s) 110 (and/or the television 160) via the wireless access device 120.

Although the wireless access device 120 is shown as a separate, stand-alone component, the wireless access device 120 may be integrated with one or more other devices such as, but not limited to, the television 160, a cable box, a satellite dish set-top box, a modem, a wireless modem, and a digital video recorder (DVR).

In various implementations of the wireless access device 120, the wireless access device 120 is implemented in a residential setting (e.g., home) and/or a commercial setting.

Figure 3:
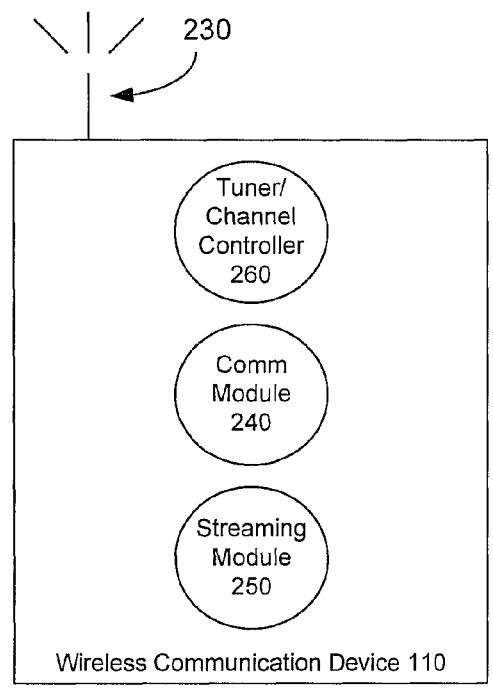
FIG. 3 is a block diagram illustrating an example wireless communication device that is part of a system for providing content on a wireless communication device via WIFI through a home network.

With reference to FIG. 3, the one or more wireless communication devices 110 include one or more antennas 230, appropriate WIFI hardware, and other appropriate hardware/software for wireless communication through the wireless connection 130 with the wireless access device 120. The one or more wireless communication devices 110 are dual mode capable (capable of cellular communication and other WLAN communication (e.g., WIFI)). A communication module 240 controls communication between the wireless communication device 110 and the wireless access device 120. The communication module 240 (or a separate communication module) may control wireless communication between the wireless communication device 110 and devices other than wireless access device 120 (e.g., other wireless communication devices 110, other computers). The communication module 240 is configured to establish a communication link 130 with the wireless access device 120. A streaming module 250 controls streaming operations for incoming and outgoing data streams. A tuner/channel controller 260 is used to control channel selection/tuning of the tuner 230 of the wireless access device 120 for selecting the desired content from the content source 140. The modules/controller 240, 250, 260 housed in data storage on the wireless communication device 110 are executed by a controller of the wireless communication device 110 for carrying out the functions described herein.

The wireless communication device(s) 110 can be any of a variety of wireless communication devices, including, but not limited to, a cell phone, personal digital assistant ("PDA"), laptop computer, or any combination of these and other devices capable of establishing a wireless communication link 130 with the wireless access device 120.

Figure 4:
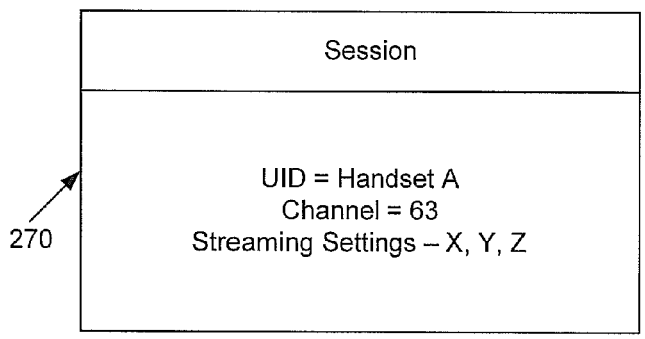
FIG. 4 is an exemplary data structure for a session of a system for providing content on a wireless communication device via WIFI through a home network.

FIG. 4 illustrates an example data structure 270 for a communication session between the wireless communication device(s) 110 and the wireless access device 120. The data structure 270 includes a unique identifier for the wireless communication device 110, channel information for the channel selected by the user, and streaming settings for the wireless communication device 110. In alternative embodiments, the data structure 270 may include additional or alternative information. For example, but not by way of limitation, the data structure 270 may include aspect ratio, color information, and/or other information pertinent to the wireless communication device 110/wireless access device 120, the settings of the wireless communication device 110/wireless access device 120, and/or user input into the wireless communication device 110. The data structure 270 may be maintained on the wireless access device 120 and/or the wireless communication device 110, and used to establish the audio/video parameters for a content session on the wireless communication device 110 via the particular link 130 (note: parameters may be changed based on characteristics of the link (e.g., speed, bandwidth)).

Figure 5:
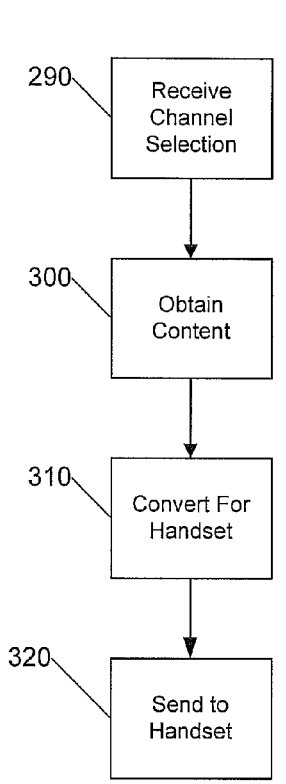
FIG. 5 is a flow diagram illustrating an example process for receiving channel selection by the wireless communication device and delivering content to the wireless communication device according to an embodiment of the present invention.

FIG. 5 is a flow diagram illustrating an example method 280 for receiving channel selection by the wireless communication device 110 and delivering television content to the wireless communication device 110 by the wireless access device 120. Although the method is described in conjunction with selecting television channels, and obtaining/viewing television content with the wireless communication device 110, the wireless communication device 110 may control the wireless access device 120 for selecting and obtaining/viewing other content. For example, but not by way of limitation, the wireless communication device 110 may control the wireless access device 120 to obtain internet content (e.g., to accesses different web sites, web pages, radio content, video files, audio files). At step 290, the channel selection is received by the wireless access device 120. As indicated above with reference to FIG. 4, the data structure 270 for a session includes, among other things, the channel information for the channel selected by the user with the wireless communication device 110. The channel information from the data structure 270 is used to control the tuner 230 to tune to the selected channel to obtain the desired content from the content source 140. At step 300, the desired content is obtained through the use of the tuner 230. As step 310, the content is converted using the conversion module 210 to the appropriate format for the wireless communication device 110. At step 320, the data is sent to the wireless communication device 110 through the wireless communication link 130 via one or more data streams or packets. Then, the wireless communication device 110 provides the selected content to the user via one or more output devices (e.g., display, audio device(s)) of the wireless communication device 110.

Figure 6:
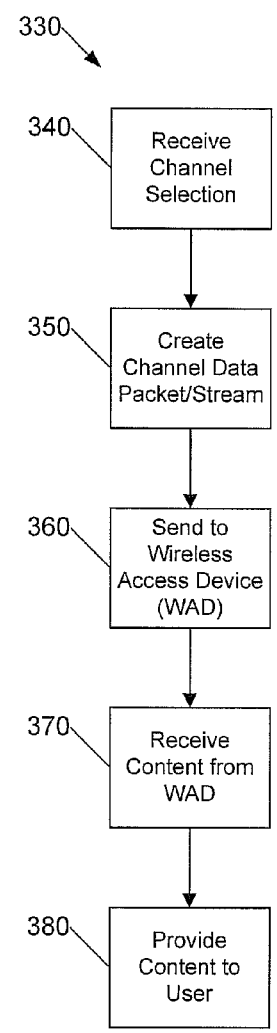
FIG. 6 is a flow diagram illustrating an example process for using the wireless communication device for obtaining content from the wireless access device according to an embodiment of the present invention.

FIG. 6 is a flow diagram illustrating an example process 330 of using the wireless communication device 110 for obtaining television content from the wireless access device 120. A user launches a television application with the wireless communication device 100, and, at step 340, the wireless communication device 110 receives channel selection input from the user. The user presses the buttons on the wireless communication device 110 to select the desired television channel. The tuner/channel controller 260 obtains this information, and, at step 350, creates one or more data streams or packets in compliance with data structure 270. As indicated above with reference to FIG. 4, the data structure 270 for a session includes, among other things, the channel information for the channel selected by the user with the wireless communication device 110. At step 360, the data is sent to the wireless access device 120 through the wireless communication link 130 via one or more data streams or packets. The wireless access device 120 tunes to the selected channel and provides the desired content in a manner such as that described with respect to FIG. 5. At step 370, the wireless communication device 110 receives the one or more data streams or packets of content. Then, at step 380, the wireless communication device 110 provides the desired content to the user via an appropriate user interface on the wireless communication device 110. The user can view and listen to the television content using the wireless communication device 110. Simultaneously, the user can place VOIP calls over the WIFI while watching the television content.

With the system 100 and methods 280, 330 described above, both a user on the wireless communication device 110 and a person controlling the television 160 (e.g., television) can view two different channels at the same time with independent controls without disturbing the content on the other device. The user watching the television can receive the content on the television using the interface through the buttons on the television or the remote control. The channel number will be received by the wireless access device 120, and the wireless access device 120 will tune to the requested channel and transmit content received to the television without any conversion. The user can also receive internet content on the television. The user can use the remote controller or a keyboard to send inputs to the television. The television will send the requests to the wireless access device 120. The wireless access device 120 will access the internet and deliver the content to the television. The user can also make and receive VoIP calls using the television, where the subscriber information used is the same as that of the wireless communication device 110.

Although in the system 100 and methods 280, 330 described above, content from the content source is described as being transmitted to the wireless communication devices 110 via the wireless access device 120, similarly, content or other information (e.g., photos, musical files, video files, data, mobile phone data (e.g., incoming call data, Short Message Service (SMS) data)) from the one or more wireless communication devices 110 may be transmitted to the television 160 and/or other output devices. In an embodiment, the television 160 (via a remote control or other controller) sends commands to the one or more wireless communication devices 110 over the network. The one or more wireless communication devices 110 respond to the commands, for example, by sending content or other information (e.g., incoming call data, SMS data) over the network to the television 160 for display/output. As another example, the user watching television can use a dedicated or software controlled button on the remote control to receive content from the wireless communication device 110 on the television. When this button is pressed, the wireless access device 120 will receive the request, and will send a content request to the wireless communication device 110. The wireless communication device 110 will send back a response based on various parameters, and this will establish a connection between the television and the wireless communication device 110 via the wireless access device 120. The wireless communication device 110 sends the screen, data, and/or audio/video content to the wireless access device 120, and the wireless access device 120 transfers it to the television 160 with or without conversion. In another embodiment, the television 160 serves as a remote monitor for the wireless communication device 110, and a wireless keyboard is used to update contacts, calendars, and/or perform other actions with respect to the wireless communication device (through the network) while viewing the updates and/or other actions related to the wireless communication device on the television 160. In alternative embodiments, the wireless communication device 110 is one or more of, but not limited to, a DVR, a VCR, a video camera, a digital camera, and a content source device.

Figure 7:
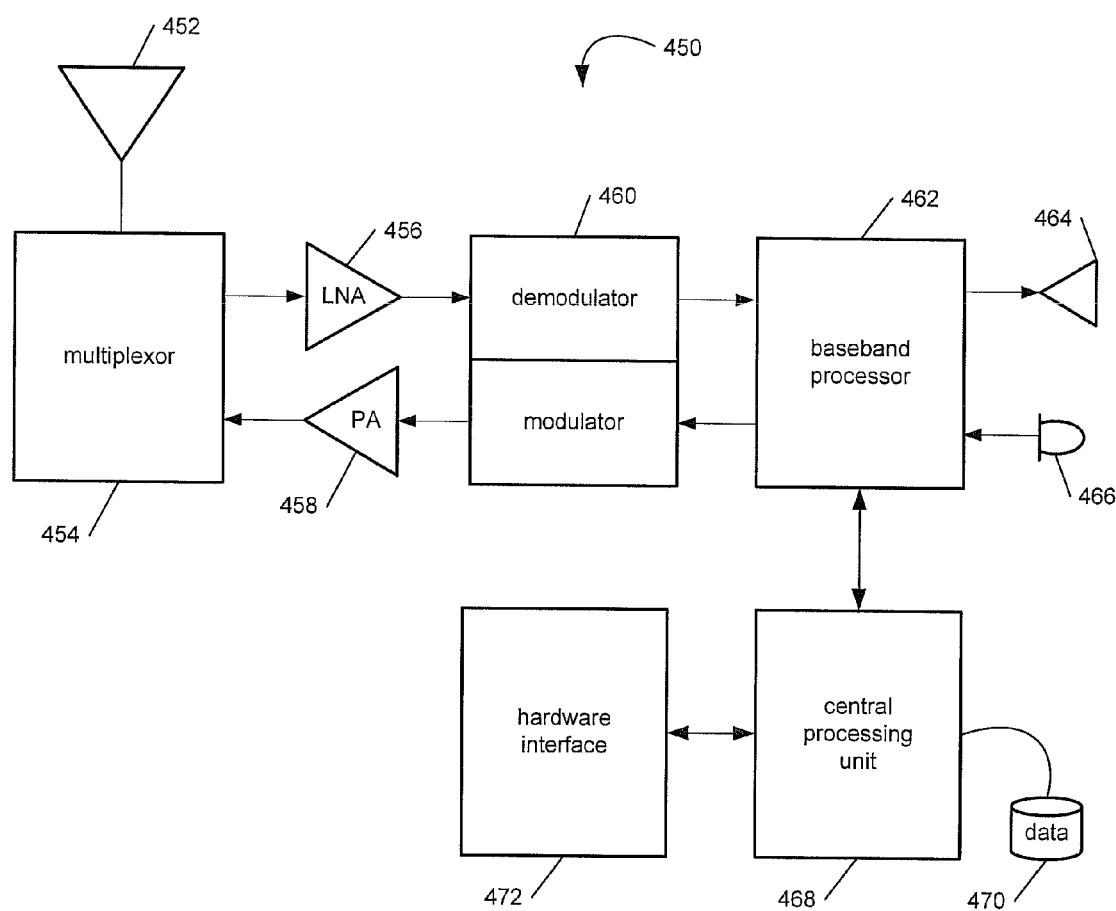
FIG. 7 is a block diagram illustrating an exemplary wireless communication device that may be used in connection with the various embodiments described herein.

FIG. 7 is a block diagram illustrating an exemplary wireless communication device 450 that may be used in connection with the various embodiments described herein. For example, the wireless communication device 450 (or various components or combinations of components of the wireless communication device 450) may be used in conjunction with the wireless communication device(s) 110 described above. However, other wireless communication devices and/or architectures may also be used, as will be clear to those skilled in the art having the benefit of the present disclosure.

In the illustrated embodiment, wireless communication device 450 comprises an antenna 452, a multiplexor 454, a low noise amplifier ("LNA") 456, a power amplifier ("PA") 458, a modulation circuit 460, a baseband processor 462, a speaker 464, a microphone 466, a central processing unit ("CPU") 468, a data storage area 470, and a hardware interface 472. In the wireless communication device 450, radio frequency ("RF") signals are transmitted and received by antenna 452. Multiplexor 454 acts as a switch, coupling antenna 452 between transmit and receive signal paths. In the receive path, received RF signals are coupled from a multiplexor 454 to LNA 456. LNA 456 amplifies the received RF signal and couples the amplified signal to a demodulation portion of the modulation circuit 460.

Typically modulation circuit 460 will combine a demodulator and modulator in one integrated circuit ("IC"). The demodulator and modulator can also be separate components. The demodulator strips away the RF carrier signal leaving a base-band receive audio signal, which is sent from the demodulator output to the base-band processor 462.

If the base-band receive audio signal contains audio information, then base-band processor 462 decodes the signal and converts it to an analog signal. Then the signal is amplified and sent to the speaker 464. The base-band processor 462 also receives analog audio signals from the microphone 466. These analog audio signals are converted to digital signals and encoded by the base-band processor 462. The base-band processor 462 also codes the digital signals for transmission and generates a base-band transmit audio signal that is routed to the modulator portion of modulation circuit 460. The modulator mixes the base-band transmit audio signal with an RF carrier signal generating an RF transmit signal that is routed to the power amplifier 458. The power amplifier 458 amplifies the RF transmit signal and routes it to the multiplexor 454 where the signal is switched to the antenna port for transmission by antenna 452.

The baseband processor 462 is also communicatively coupled with the central processing unit 468. The central processing unit 468 has access to a data storage area 470. The central processing unit 468 is preferably configured to execute instructions (i.e., computer programs or software) that can be stored in the data storage area 470. Computer programs can also be received from the baseband processor 462 and stored in the data storage area 470 or executed upon receipt. Such computer programs, when executed, enable the wireless communication device 450 to perform the various functions of the present invention as previously described.

In this description, the term "computer readable medium" is used to refer to any media used to provide executable instructions (e.g., software and computer programs) to the wireless communication device 450 for execution by the central processing unit 468. Examples of these media include the data storage area 470, microphone 466 (via the baseband processor 462), antenna 452 (also via the baseband processor 462), and hardware interface 472. These computer readable mediums are means for providing executable code, programming instructions, and software to the wireless communication device 450. The executable code, programming instructions, and software, when executed by the central processing unit 468, preferably cause the central processing unit 468 to perform the inventive features and functions previously described herein.

The central processing unit is also preferably configured to receive notifications from the hardware interface 472 when new devices are detected by the hardware interface. Hardware interface 472 can be a combination electromechanical detector with controlling software that communicates with the CPU 468 and interacts with new devices.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

Figure 8:
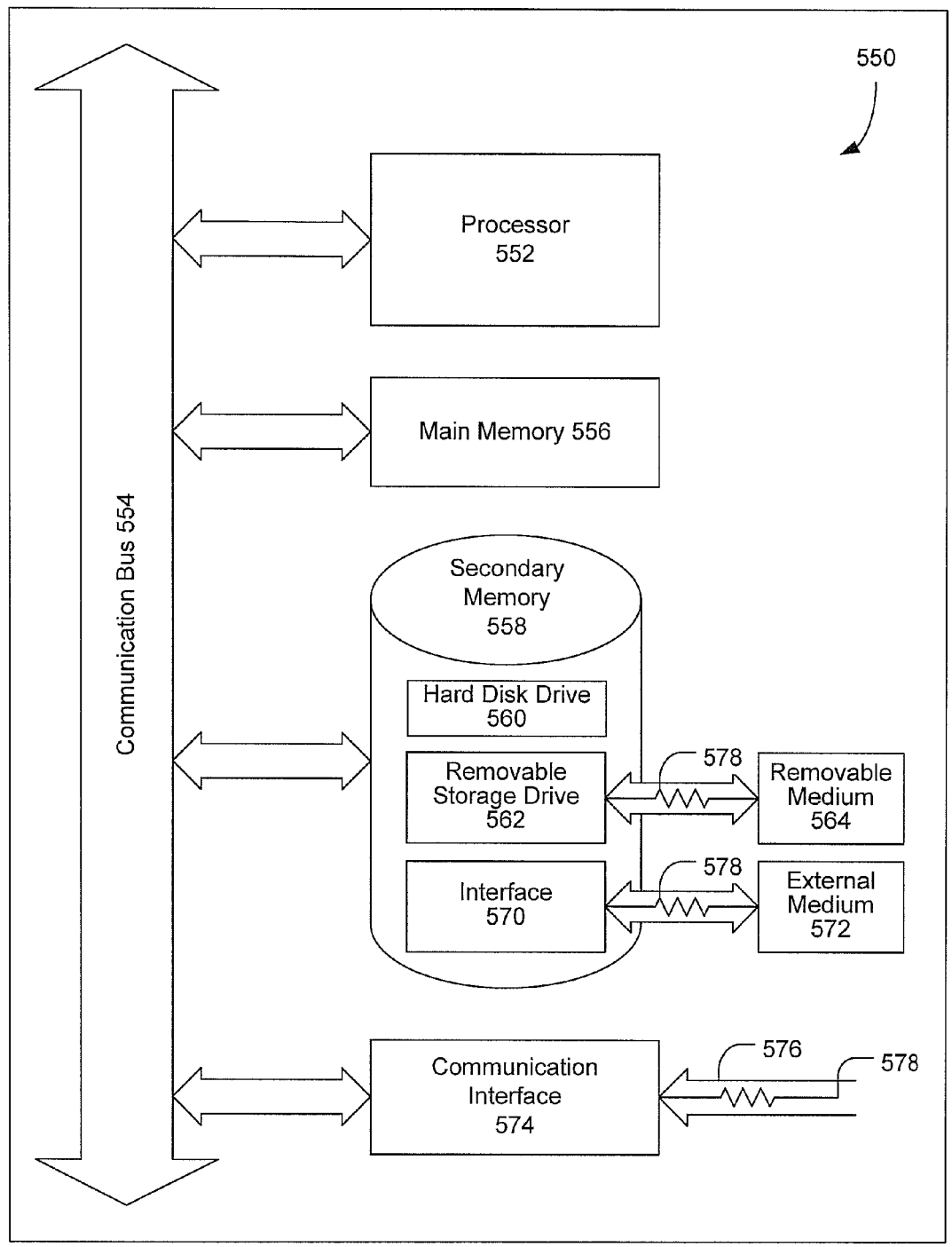
FIG. 8 is a block diagram illustrating an exemplary computer system that may be used in connection with the various embodiments described herein.

FIG. 8 is a block diagram illustrating an exemplary computer system 550 that may be used in connection with the various embodiments described herein. For example, the computer system 550 (or various components or combinations of components of the computer system 550) may be used in conjunction with the wireless access device 120 as previously described. However, other computer systems and/or architectures may be used, as will be clear to those skilled in the art having the benefit of the present disclosure.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method for providing television content to a wireless communication device via a home network, the home network including a wireless access device with a plurality of tuners in communication with a television content source through a first communication link, in communication with a television through a second communication link, and in communication with a wireless communication device through a third, wireless communication link; comprising:
    receiving from the wireless communication device over the third, wireless communication link, channel selection information for a first selected channel, streaming settings for controlling streaming operations between the wireless communication device and the wireless access device, and format information for a display on the wireless communication device;
    tuning a first of the plurality of tuners to the first selected channel;
    obtaining television content from the content source for the first selected channel via the first communication link;
    converting the television content for the first selected channel in accordance with said format information for the display on the wireless communication device;
    sending the television content for the first selected channel in the converted format to the wireless communication device over the third, wireless communication link, in accordance with said streaming settings.

2. The method of claim 1, further comprising receiving a unique identifier for the wireless communication device with the channel information, streaming settings, and format information.

3. The method of claim 1, wherein the third, wireless communication link is a WIFI communication link.

4. The method of claim 1, wherein the content source is at least one of a digital cable television provider, a satellite television provider, and the internet.

5. The method of claim 1, further including receiving from the television over the second communication link, channel selection information for a second selected channel;
    tuning a second of the plurality of tuners to the second selected channel;
    obtaining different television content from the content source for the second selected channel via the first communication link; and
    sending the different television content for the second selected channel to the television.

6. The method of claim 1, further including simultaneously placing a call from the wireless communication device over the third, wireless communication link while television content is presented on the display of the wireless communication device.

7. A wireless access device for providing television content to a wireless communication device via a home network, the home network including the wireless access device in communication with a television content source through a first communication link, in communication with a television through a second communication link, and in communication with a wireless communication device through a third, wireless communication link; comprising:
    one or more antennas for wireless communication with the wireless communication device;
    a plurality of tuners for tuning to one or more selected channels; and
    one or more modules including:
    a function to receive from the wireless communication device over the third, wireless communication link, channel selection information for a first selected channel, streaming settings for controlling streaming operations between the wireless communication device and the wireless access device, and format information for a display on the wireless communication device;
    a function to tune a first of the plurality of tuners to the first selected channel;
    a function to obtain television content from the content source for the first selected channel via the first communication link;
    a function to convert the television content for the first selected channel in accordance with said format information for the display on the wireless communication device;
    a function to send the television content for the first selected channel in the converted format to the wireless communication device over the third, wireless communication link, in accordance with said streaming settings.

8. The wireless access device of claim 7, wherein the third, wireless communication link is a WIFI communication link, and the one or more antennas are configured to provide WIFI communication with the wireless communication device.

9. The wireless access device of claim 7, wherein the one or more modules further include a function to receive from the television over the second communication link, channel selection information for a second selected channel;
    a function to tune a second of the plurality of tuners to the second selected channel;
    a function to obtain different television content from the content source for the second selected channel via the first communication link; and
    a function to send the different television content for the second selected channel to the television.

10. The wireless access device of claim 7, further including a function to send and receive content over the Internet.

11. A wireless communication device for providing television content to a user via a home network, the home network including a wireless access device with a plurality of tuners in communication with a television content source through a first communication link, in communication with a television through a second communication link, and in communication with a wireless communication device through a third, wireless communication link, comprising:
    an antenna for wireless communication with the wireless access device;
    one or more modules including:
    a function to receive a channel selection input from a user;
    a function to create one or more data streams or packets with data structure representative of the channel selection input;
    a function to send the one or more data streams or packets with data structure representative of the channel selection input to the wireless access device through the third, wireless communication link for obtaining television content for the selected channel from the content source via the wireless access device;
    a function to receive one or more data streams or packets of television content for the selected channel in an appropriate format for the wireless communication device over the third, wireless communication link;

a function to provide the selected television content to the user via an appropriate user interface on the wireless communication device; and a function to simultaneously place a call over the third, wireless communication link while television content is presented on the display of the wireless communication device.

12. The wireless communication device of claim 11, wherein the third, wireless communication link is a WIFI communication link, and the antenna is configured to provide WIFI communication with the wireless access device.

13. The wireless communication device of claim 11, wherein the wireless communication device is dual mode capable of cellular communication and wireless communication.

14. The method of claim 11, wherein the content source is at least one of a digital cable television provider, a satellite television provider, and the internet.

* * * * *